(12) United States Patent
Beall et al.

(10) Patent No.: US 7,001,861 B2
(45) Date of Patent: Feb. 21, 2006

(54) ALUMINUM TITANATE-BASED CERAMIC ARTICLE

(75) Inventors: George H. Beall, Big Flats, NY (US); Isabelle M. Melscoet-Chauvel, Painted Post, NY (US); Steven B. Ogunwumi, Painted Post, NY (US); Dell J. St. Julien, Watkins Glen, NY (US); Patrick D. Tepesch, Corning, NY (US); Christopher J. Warren, Waverly, NY (US)

(73) Assignee: Corning Incorporated, Corning, NY (US)

(*) Notice: Subject to any disclaimer, the term of this patent is extended or adjusted under 35 U.S.C. 154(b) by 115 days.

(21) Appl. No.: 10/626,317

(22) Filed: Jul. 24, 2003

(65) Prior Publication Data
US 2004/0092381 A1 May 13, 2004

Related U.S. Application Data

(60) Provisional application No. 60/400,248, filed on Jul. 31, 2002.

(51) Int. Cl.
 C04B 35/478 (2006.01)
 C04B 35/185 (2006.01)
 C04B 35/195 (2006.01)
 B01D 39/20 (2006.01)

(52) U.S. Cl. .................. 501/128; 501/134; 55/523; 264/631

(58) Field of Classification Search ............... 501/128, 501/134; 55/523; 264/631
See application file for complete search history.

(56) References Cited

U.S. PATENT DOCUMENTS

| | | | |
|---|---|---|---|
| 2,776,896 A | 1/1957 | Harman et al. | |
| 3,578,471 A | 5/1971 | Lachman | |
| 4,483,944 A | 11/1984 | Day et al. | |
| 4,767,731 A | 8/1988 | Asami et al. | |
| 4,855,265 A | 8/1989 | Day et al. | |
| 5,288,672 A | 2/1994 | Gugel et al. | |
| 5,290,739 A | 3/1994 | Hickman | |
| 5,346,870 A | 9/1994 | Noguchi et al. | |
| 5,422,324 A | 6/1995 | Noguchi et al. | |
| 6,101,793 A | 8/2000 | Nagai et al. | |
| 6,210,645 B1 | 4/2001 | Kumazawa et al. | |
| 6,620,751 B1 | 9/2003 | Ogunwumi | |
| 6,849,181 B1 * | 2/2005 | Ogunwumi et al. | 210/510.1 |
| 2003/0015829 A1 * | 1/2003 | Fukuda et al. | 264/674 |

FOREIGN PATENT DOCUMENTS

| | | |
|---|---|---|
| EP | 0 036 462 | 6/1990 |
| EP | 0 873 775 | 10/1998 |
| JP | 2-229763 | 9/1990 |

OTHER PUBLICATIONS

Lachman et al, "High Temperature Monolithic Supports for Automobile Exhaust Catalysis", Ceram Eng.Sci.Proc (1981),2 (5-6) p. 337-351.
Takahashi et al., "Preparation, structure and properties of thermally and mechanically improved aluminum titanate ceramics doped with alkali feldspar", To be submitted to J. Amer. Ceram. Soc., p. 1-29, no date.
Fukuda et al., "Modified Tialite Ceramics for High Temperature Use", p. 1-19, no date.

* cited by examiner

*Primary Examiner*—Karl Group
(74) *Attorney, Agent, or Firm*—Randall S. Wayland; Anca C. Gheorghiu

(57) ABSTRACT

An aluminum titanate-based ceramic article having a composition comprising u $(Al_2O_3-TiO_2)$+v (R)+w $(3Al_2O_3-2SiO_2)$+x $(Al_2O_3)$+y $(SiO_2)$+z $(1.1SrO-1.5Al_2O_3-13.6SiO_2-TiO_2)$+a $(Fe_2O_3-TiO_2)$+b $(MgO-2TiO_2)$, where, R is $SrO-Al_2O_3-2SiO_2$ or $11.2SrO-10.9Al_2O_3-24.1SiO_2-TiO_2$, where u, v, w, x, y, z, a and b are weight fractions of each component such that (u+v+w+x+y+z+a+b=1), and $0.5 < u \leq 0.95$, $0.01 < v \leq 0.5$, $0.01 < w \leq 0.5$, $0 \leq x \leq 0.5$, $0 \leq y \leq 0.1$, $0 \leq z \leq 0.5$, $0 < a \leq 0.3$, and $0 \leq b \leq 0.3$. A method of forming the ceramic article is provided. The ceramic article is useful in automotive emissions control systems, such as diesel exhaust filtration.

33 Claims, 3 Drawing Sheets

ALUMINUM TITANATE-BASED CERAMIC ARTICLE

This application claims the benefit of U.S. Provisional Application No. 60/400,248, filed Jul. 31, 2002, entitled "Aluminum Titanate-Based Ceramic Article", by Melscoet et al.

BACKGROUND OF THE INVENTION

The instant invention relates to aluminum titanate-based ceramic articles for use in high temperature applications. Specifically the invention relates to aluminum titanate-based ceramic articles having high permeability in combination with low thermal expansion and high thermal shock resistance, and being suitable for automotive emissions control.

In the industry cordierite ($2MgO.2Al_2O_3.5SiO_2$) has been the cost-effective material of choice for automotive emissions control applications, such diesel exhaust aftertreatment systems, due to its combination of good thermal shock resistance, filtration efficiency, and durability under most operating conditions. However, under certain circumstances cordierite filters are susceptible to damage and have even catastrophically failed. Occasional thermal runaway occurs during uncontrolled regenerations resulting in localized cordierite melting.

Another factor contributing to cordierite failure occurs when metal impurities from the engine oil, catalytic additives or corroded metal from the exhaust port liners are introduced into the filter during operation. Typically, at temperatures exceeding 1300° C., these metals form oxides which react with the cordierite structure. Evidence of the failed material are usually small holes on the filter where the metal initially deposits and reacts causing corrosion and melting of the material.

Recently, silicon carbide (SiC) wall-flow filters have been made commercially available for diesel exhaust filtration. However, SiC filters are costly to manufacture, and must be segmented due to an inherent high coefficient of thermal expansion (CTE) and poor thermal shock resistance.

A need therefore exists for a ceramic article suitable for high temperature applications, such as automotive emissions control systems without the shortfalls of currently existing materials. The present invention provides such a ceramic material, and a method of making and using the same.

SUMMARY OF THE INVENTION

The instant invention is founded upon the discovery of aluminum titanate-based ceramic articles of high, interconnected porosity and large median pore size, further combining high permeability, and being capable of employment in high temperature applications, such as automotive emissions control, including but not limited to automotive catalytic converters, and diesel exhaust aftertreatment systems, such as diesel particulate filters.

In one aspect of the invention there is provided a ceramic article having a composition comprising u ($Al_2O_3$—$TiO_2$)+v (R)+w ($3Al_2O_3$-$2SiO_2$)+x ($Al_2O_3$)+y ($SiO_2$)+z ($1.1SrO$-$1.5Al_2O_3$-$13.6SiO_2$—$TiO_2$)+a ($Fe_2O_3$—$TiO_2$)+b ($MgO$-$2TiO_2$), where, R is $SrO$—$Al_2O_3$-$2SiO_2$ or $11.2SrO$-$10.9Al_2O_3$-$24.1SiO_2$—$TiO_2$, where u, v, w, x, y, z, a and b are weight fractions of each component such that (u+v+w+x+y+z+a+b=1), and $0.5<u\leq0.95$, $0.01<v\leq0.5$, $0.01<w\leq0.5$, $0\leq x\leq 0.5$, $0\leq y\leq 0.1$, $0\leq z\leq 0.5$, $0<a\leq 0.3$, and $0\leq b\leq 0.3$. Phases of aluminum titanate ($Al_2O_3.TiO_2$), strontium feldspar ($SrO.Al_2O_3.2SiO_2$), mullite ($3Al_2O_3.2SiO_2$), alumina ($Al_2O_3$), and/or glass have been observed by x-ray diffraction, and electron-probe microanalysis in the inventive ceramic. These phases are not required to be perfectly stoichiometric, or crystalline in the final product.

Silica and glass additions improve strength, decrease porosity, lower thermal expansion and firing temperature, and may provide resistance of the ceramic against decomposition. Alumina additions increase porosity. As provided silica additions of up to 10% by weight (based on total batch weight) and alumina additions of up to 50% by weight may be made. Glass having a composition represented by $1.1SrO$-$1.5Al_2O_3$-$13.6SiO_2$—$TiO_2$ may be added in an amount of up to 50% by weight. Iron titanate and/or magnesium titanate may be substituted for up to 30% by weight of the aluminum titanate phase. These substitutions improve the resistance to decomposition of the aluminum titanate phase at temperatures between 800°–1200° C.

In another aspect of the invention the inventive ceramic article exhibits a coefficient of thermal expansion (CTE), as measured from room temperature to 800°–1000° C. of less than $45\times10^{-7}/°$ C., preferably less than $25\times10^{-7}/°$ C., and more preferably less than $5\times10^{-7}/°$ C.; a porosity of up to 60% by volume, preferably up to 55% by volume, and more preferably up to 45% by volume; a median pore size up to 25 micrometers, preferably up to 20 micrometers, and more preferably up to 15 micrometers; and, a modulus of rupture, as measured on a solid rod of circular cross section of greater than 400 pounds per square inch (psi), preferably greater than 700 psi.

In another aspect of the invention there is provided a method of making an aluminum titanate-based ceramic body comprising: (a) formulating a batch of inorganic raw materials comprising sources of silica, alumina, strontium, titania, and/or iron oxide together with organic processing comprising plasticizers, lubricants, binders, and water as solvent, and mixing to form a homogeneous and plasticized mixture; (b) shaping the plasticized mixture into a green body; (c) heating the green body at 20–40° C./hr over various temperature intervals with hold temperature and times between 1100°–1650° C., preferably 1100°–1500° C. for a period of 30–50 hours to develop a fired aluminum-titanate body. The substantially low sintering temperatures of between 1100°–1650° C., preferably 1100°–1500° C. significantly reduce manufacturing costs, while maintaining low thermal expansion, high thermal shock resistance and high mechanical strength in the inventive ceramic.

In another aspect of the invention there is provided a diesel particulate filter comprising the inventive ceramic. A successful application of diesel exhaust filters requires low pressure drops and low back pressure against the engine, along with high durability during thermal cycling. The diesel particulate filter is comprised of a plugged, wall-flow honeycomb body having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

In a preferred embodiment the diesel particulate filter comprises a honeycomb body composed of an aluminum titanate-based ceramic according to the present invention having a composition comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1) and u=0.6965, v=0.225, w=0.075, x=0, y=0, z=0, a=0.0035, and b=0.

In another embodiment the diesel particulate filter exhibits the following properties: a CTE (RT to 800°–1000° C.) of less than $15\times10^{-7}/°$ C., preferably less than $5\times10^{-7}/°$ C.; a porosity of 30% to 50%, preferably 35% to 45% by volume; a median pore size of 5 to 20 micrometers, preferably 10 to 15 micrometers; and, a modulus of rupture, as measured by the four-point method on a cellular bar cut parallel to the direction of the channels from a honeycomb body having a cell density of 200 cells per square inch (cpsi) and 0.016 inch thick walls, of 150 to 400 psi, preferably 150 to 300 psi; a permeability of at least $0.20\times10^{-12}$ m$^2$, preferably 0.33 to $1.00\times10^{-12}$ m$^2$; and, a pressure drop of 5 kPa or less at an artificial carbon soot loading of up to 5 g/L at a flow rate of 210 scfm for a cell density of 273 cpsi, and a cell wall thickness of 0.015 inch in a 5.66"×6" sample.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

The invention provides an aluminum titanate-based ceramic comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1), and $0.5<u\leq0.95$, $0.01<v\leq0.5$, $0.01<w\leq0.5$, $0\leq x\leq0.5$, $0\leq y\leq0.1$, $0\leq z\leq0.5$, $0<a\leq0.3$, and $0\leq b\leq0.3$.

The inventive ceramic is highly refractory with a low coefficient of thermal expansion (CTE), and increased thermal durability, making it suitable for high temperature applications, including but not limited to automotive emissions control systems. Accordingly, the thermal expansion (coefficient of thermal expansion) as measured by dilatometry over a temperature range from room temperature room temperature (RT) to 800°–1000° C., is less than $45\times10^{-7}/°$ C., preferably less than $25\times10^{-7}/°$ C., and more preferably less than $5\times10^{-7}/°$ C. The low expansion of the inventive structure is a result of microcracking generated by anisotropic thermal expansion.

Figure 1:
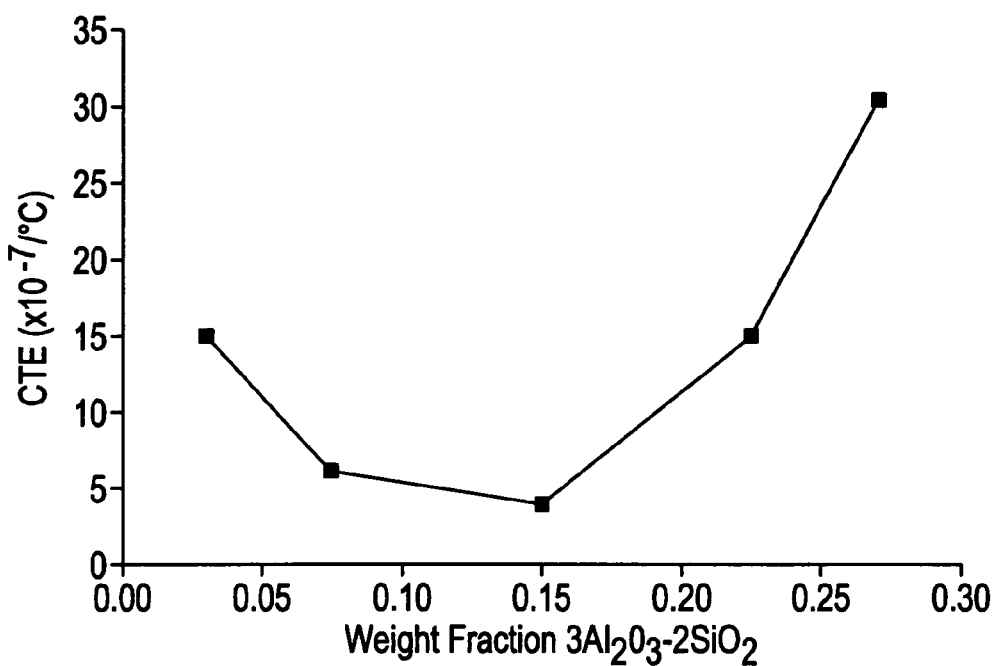
FIG. 1 is a graphical representation of thermal expansion as a function of $0<w<0.30(3Al_2O_3\text{-}2SiO_2)$ for compositions where u=0.7$(Al_2O_3—TiO_2)$, with the remainder being $(SrO—Al_2O_3\text{-}2SiO_2)$; the compositions were fired at 1500° C. for 4 hours.

Accordingly, an advantage of the present inventive structure is that the thermal expansion hysteresis (i.e., the difference between heating and cooling curves) can be made very low. This ensures a high thermal shock resistance. Referring now to FIG. 1 there is provided a graphical representation of thermal expansion as a function of $0<w<0.30(3Al_2O_3\text{-}2SiO_2)$ for compositions where u=0.7 $(Al_2O_3—TiO_2)$ the remainder $SrO—Al_2O_3\text{-}2SiO_2$, fired at 1500° C. for 4 hours. To obtain a low CTE of less than $5\times10^{-7}/°$ C., preferably w ranges between 0.05–0.15. At both lower and higher values of w, the thermal expansion increases.

Figure 2:
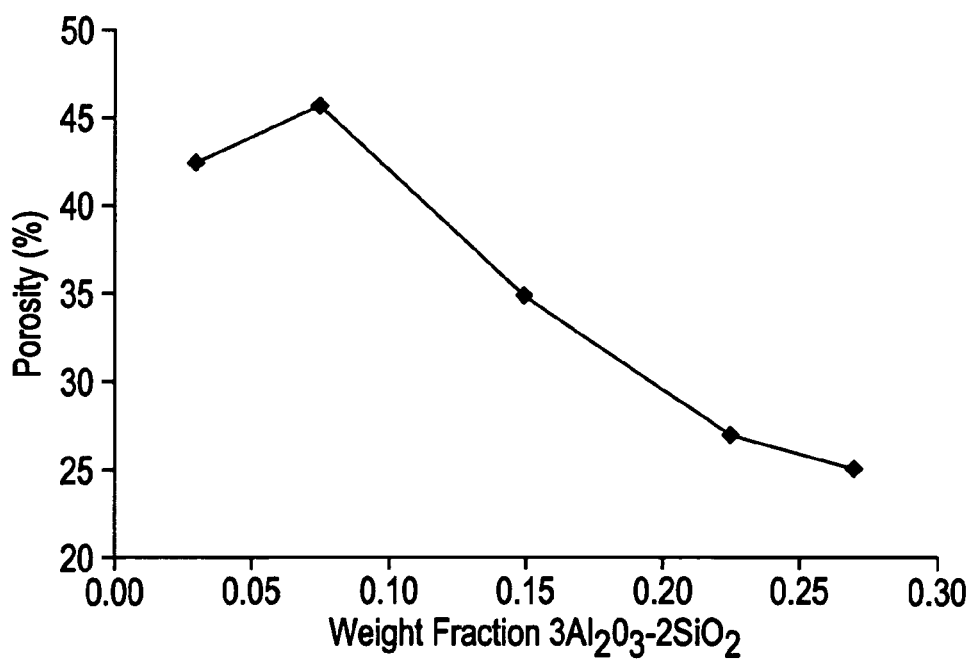
FIG. 2 is a graphical representation of porosity as a function of $0<w<0.30(3Al_2O_3\text{-}2SiO_2)$ for compositions where u=0.7$(Al_2O_3—TiO_2)$, with the remainder being $(SrO—Al_2O_3\text{-}2SiO_2)$; the compositions were fired at 1500° C. for 4 hours.

In addition to low thermal expansion, the inventive ceramic is particularly suitable to high interconnected porosity and large median pore size. Accordingly, the porosity as measured by mercury porosimetry is up to 60% by volume, preferably up to 55% by volume, and more preferably up to 45% by volume. The median pore size is up to 25 micrometers, preferably up to 20 micrometers, and more preferably up to 15 micrometers. Referring now to FIG. 2 there is provided a graphical representation of porosity as a function of $0<w<0.30(3Al_2O_3\text{-}2SiO_2)$ for compositions where u=0.7 $(Al_2O_3—TiO_2)$, with the remainder being $(SrO—Al_2O_3\text{-}2SiO_2)$, fired at 1500° C. for 4 hours. A peak in porosity is obtained at w between 0.08–0.11. At both lower and higher values of w, the porosity decreases, with the lowest porosity values at w>0.25.

Figure 3:
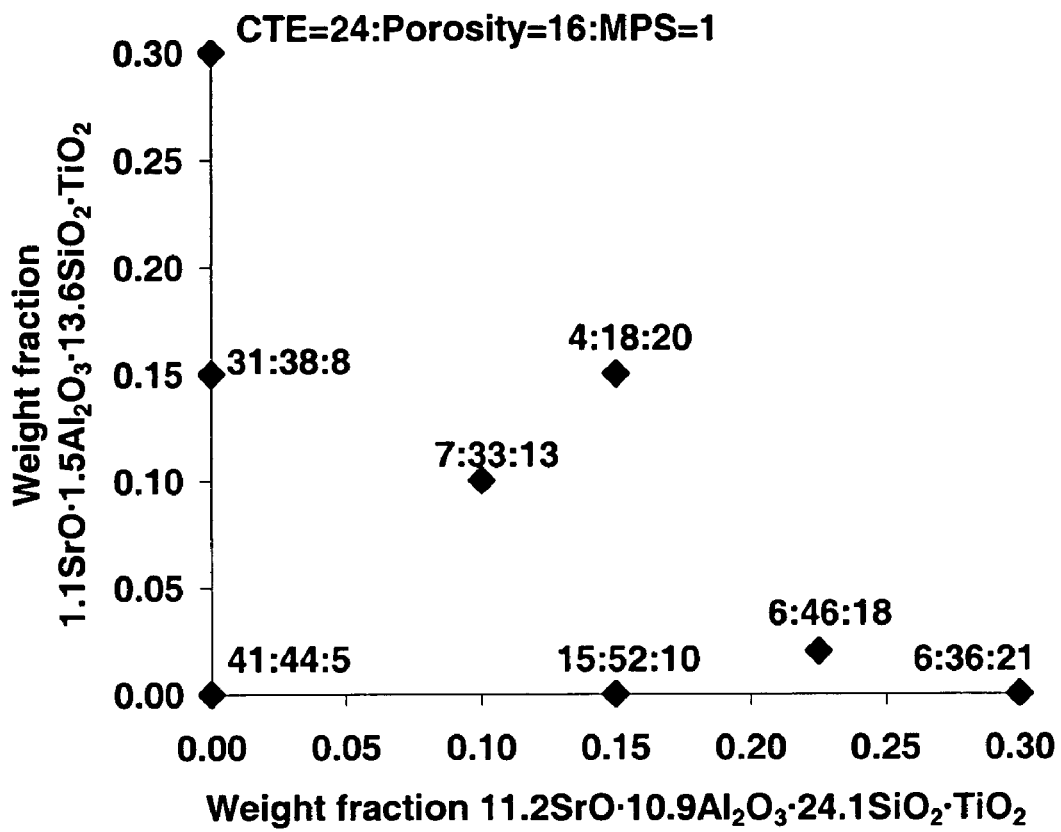
FIG. 3 is comparison of the thermal expansion (CTE) ($10^{-7}/°$ C.), porosity (% volume), and median pore size (MPS) (micrometers) as a function of $0<z<0.30(1.1SrO\text{-}1.5Al_2O_3\text{-}13.6SiO_2—TiO_2)$ represented on the y-axis and $0<v<0.30$ $(11.2SrO\text{-}10.9Al_2O_3\text{-}24.1SiO_2—TiO_2)$ represented on the x-axis; the compositions have u=0.6965 $(Al_2O_3—TiO_2)$, a=0.0045 $(Fe_2O_3—TiO_2)$, with the remainder being $Al_2O_3$; the compositions were fired at 1495° C. for 8 hours; and, FIG. 4 is a graphical representation of pressure drop value between the inlet end and outlet end (i.e., pressure drop difference) in KPa as a function of soot loading (g/L) at a gas flow rate of 210 scfm, for a diesel particulate filter comprising the inventive ceramic having a composition as provided in Example 5 of Table 1, in a sample having dimensions of 5.66 inch×6 inch, a cell geometry of 273 cells per square inch (cpsi) with a cell wall thickness of 0.015 inch.

Referring now to FIG. 3 therein provided is a comparison of the thermal expansion (CTE)($10^{-7}/°$ C.), porosity (% volume), and median pore size (MPS) (micrometers) as a function of $0<z<0.30(1.1SrO\text{-}1.5Al_2O_3\text{-}13.6SiO_2—TiO_2)$ represented on the y-axis and $0<v<0.30(11.2SrO\text{-}10.9Al_2O_3\text{-}24.1SiO_2—TiO_2)$ represented on the x-axis. The compositions have u=0.6965$(Al_2O_3—TiO_2)$, a=0.0045 $(Fe_2O_3—TiO_2)$ with the remainder being $Al_2O_3$, and were fired at 1495° C. for 8 hours. By varying the weight fractions of both z and v, the CTE, porosity and MPS can be controlled in inventive ceramic bodies for desired applications. Also, the inventive ceramic bodies exhibit a high modulus of rupture, as measured on a solid rod of circular cross section of greater than 400 pounds per square inch (psi), preferably greater than 700 psi.

The inventive ceramic is particularly suitable for diesel exhaust filtration. In a preferred embodiment, a diesel particulate filter comprises a plugged, wall-flow filter body composed of the inventive ceramic having a composition preferably comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1), and u=0.6965, v=0.225, w=0.075, x=0, y=0, z=0, a=0.0035, and b=0.

The honeycomb filter body has an inlet end and an outlet end and a multiplicity of cells extending from the inlet end to the outlet end, the cells having porous walls. Part of the total number of cells at the inlet end are plugged along a portion of their lengths, and the remaining part of cells that are open at the inlet end are plugged at the outlet end along a portion of their lengths. This plugging configuration allows for engine exhaust stream passing through the cells of the honeycomb from the inlet end to the outlet end to flow into the open cells, through the cell walls, and out of the structure through the open cells at the outlet end. Suitable cellular densities for diesel particulate filters range from 70 cells/in$^2$ (10.9 cells/cm$^2$) to 800 cells/in$^2$ (124 cells/cm$^2$).

In another preferred embodiment, a diesel particulate filter according to the present invention exhibits a CTE (RT to 800°–1000° C.) of less than $15 \times 10^{-7}/°$ C., preferably less than $5 \times 10^{-7}/°$ C.; a porosity of 30% to 50%, preferably 35% to 45% by volume; a median pore size of 5 to 20 micrometers, preferably 10 to 15 micrometers; and, a modulus of rupture, as measured by the four-point method on a cellular bar cut parallel to the direction of the channels from a honeycomb body having a cell density of 200 cpsi and 0.016 inch thick walls, of 150 to 400 psi, preferably 150 to 300 psi; a permeability of at least $0.20 \times 10^{-12}$ m$^2$, preferably 0.33 to $1.00 \times 10^{-12}$ m$^2$; and, a pressure drop of 5 kPa or less at an artificial carbon soot loading of up to 5 g/L at a flow rate of 210 scfm for a cell density of 273 cpsi, and a cell wall thickness of 0.015 inch in a 5.66"×6" sample. Further, an increment in a linear dimension of less than 0.05% after the filter has been exposed two hundred times to thermal cycling at a temperature of 200° to 1100° C. (18 minutes per cycle with a 3 minute hold at the top temperature) has been obtained experimentally with the inventive structures.

The invention also relates to a method of fabricating the inventive aluminum titanate-based ceramic for forming a mixture from certain inorganic powdered raw materials which include sources of silica, alumina, strontium, titania, and/or iron oxide. The raw materials are blended with together with organic processing aids that may include plasticizers, lubricants, binder, and water as solvent. The mixture is then shaped into a green body, optionally dried, and fired to form the product structure. A pore former, such as graphite or polyethylene beads, may be optionally used to improve the porosity and median pore size. A pore former is a fugitive particulate material which evaporates or undergoes vaporization by combustion during drying or heating of the green body to obtain a desired, usually higher porosity and/or coarser median pore diameter. Large particle sizes in the raw materials are not preferred.

An alumina source is a powder which when heated to a sufficiently high temperature in the absence of other raw materials, yield substantially pure aluminum oxide, and includes alpha-alumina, a transition alumina such as gamma-alumina or rho-alumina, hydrated alumina, gibbsite, boehmite, aluminum hydroxide, and mixtures thereof. The particle size of the alumina source is up to 25 micrometers. A silica source includes cristobalite, non-crystalline silica such as fused silica or sol-gel silica, silicone resin, zeolite, and diatomaceous silica, kaolin, and quartz. The median particle size of the silica source is up to 30 micrometers.

A titania source is preferably, but not limited to, rutile. The median particle size of the titania source is important to avoid entrapment of unreacted oxide by the rapidly growing nuclei in the structure. Accordingly, the median particle size is up to 20 micrometers. A strontium source is strontium carbonate, with a median particle size is up to 20 micrometers. Iron oxide source has a median particle size of up to 0.5 micrometers.

The inorganic powdered raw materials are mixed with organic processing components, such as methylcellulose binder, oleic acid/triethanol amine surfactant, to form a plasticized and homogeneous mixture. The plasticized mixture is shaped by any conventional means, preferably by extrusion through a honeycomb die. The resulting green bodies are optionally dried, and then heated at 20–40° C./hr over various temperature intervals with hold temperature and times between 1100°–1650° C., preferably 1100°–1500° C. for a period of 30–50 hours to develop the final product structure.

To obtain a wall-flow filter, a portion of the cells of the honeycomb structure at the inlet end or face are plugged, as known in the art. The plugging is only at the ends of the cells which is typically to a depth of about 1 to 20 mm, although this can vary. A portion of the cells on the outlet end but not corresponding to those on the inlet end are plugged. Therefore, each cell is plugged only at one end. The preferred arrangement is to have every other cell on a given face plugged in a checkered pattern.

To more fully illustrate the invention, the following non-limiting examples are presented. All parts, portions and percentages are on a weight basis unless otherwise stated.

EXAMPLES

Inventive samples are prepared by weighing out the dry ingredients, mixing them with organic components and water, and kneading the mixture in a stainless steel muller to form a plastic mass. Table I provides parts and proportions for the powdered raw materials and forming aids. Specifically, triethanolamine (TEA) is first mixed with water, and then with oleic acid and/or tall oil (dispersant). The resulting solution is stored at room temperature for 24 hours and then refrigerated overnight prior to use. The dry ingredients which include silica, titania, strontium carbonate, iron oxide, alumina, alumina hydroxide, silicone resin, graphite, polyethylene beads and/or methyl cellulose binder are dry mixed in a muller. The tall oil/TEA/water solution is slowly added during continuous mixing to provide homogenization and plasticization.

The plasticized mixture is extruded through a die into honeycomb bodies having approximately 100 to 400 cpsi and a wall thickness of about 0.010 to 0.025 inch. The bodies thus formed are cut to desired lengths, and heated in an oven at 85° C. until dry. The samples are fired in an electric furnace at rates ranging from 20° C./hr–40° C./hr over various temperature intervals with a first hold temperature at 1200° C. for 4 hours, and a second hold temperature at 1500° C. for 6 hours to develop the final product structure, and cooled by shutting off power to the furnace.

The following properties are measured and included in Table II: modulus of rupture in pounds per square inch (psi) (as measured on a cellular bar cut parallel to the direction of the channels from a honeycomb body having a cell density of 200 cpsi and 0.016 inch thick walls, unless otherwise stated) porosity in % volume, median pore size in micrometers, thermal expansion $10^{-7}/°$ C., and permeability $10^{-12}$ m$^2$. A preferred composition, in terms of properties, is provided for Example 5. This composition is especially suitable for the manufacture of diesel particulate filters comprising a plugged, wall-flow honeycomb body.

Figure 4:

Accordingly, an extruded honeycomb body comprising Example 5 ceramic is end-plugged at the inlet and outlet ends with a cold-set paste made of aluminum titanate powder. Dimensions of the sample include a diameter of 5.66 inches, and a length of 6 inches, a cell geometry of 273 cpsi and a cell wall thickness of 0.015 inch walls. The back pressure is tested by loading the sample with artificial soot (similar to copier toner) at a flow rate of 210 scfm, for loadings ranging up to 5 g/L, and measuring the pressure drop between the inlet end and the outlet end in kPa. The resulting data is graphically provided in FIG. 4 which demonstrates excellent pressure drops of between 2 kPa and 5 kPa.

The effect of heat treatment on the inventive ceramic is also examined on Examples 2 and 3, with the results being provided in Table III. Specifically, it is demonstrated that firing conditions can be employed to tailor the properties of strength, porosity, median pore size and permeability as desired or according to specific applications.

In summary the present invention provides an aluminum titanate-based ceramic having low thermal expansion, and increased thermal durability, with applicability in automotive emissions control system, and in particular in diesel exhaust filtration where low pressure drop and low back pressure against the engine are required. The inventive ceramic can be formed with these desired properties at substantially low sintering temperatures of between 1100° C.–1650° C., preferably 1160° C.–1500° C., significantly reducing costs associated with manufacturing thereof.

It should be understood that while the present invention has been described in detail with respect to certain illustrative and specific embodiments thereof, it should not be considered limited to such but may be used in other ways without departing from the spirit of the invention and the scope of the appended claims.

TABLE I

Raw Materials for Inventive Examples 1–9.

| | Example Number | | | | | | | | |
|---|---|---|---|---|---|---|---|---|---|
| | 1 | 2 | 3 | 4 | 5 | 6 | 7 | 8 | 9 |
| Raw Material (wt. %) | | | | | | | | | |
| $SiO_2$ Silverbond 200 ® (Unimin Corp) | 10.11 | 10.11 | 2.11 | 10.0 | 10.0 | 10.0 | 10.0 | 10.1 | 11.4 |
| $Al_2O_3$ RMA ® (−325 mesh) (Alcan) | 49.77 | 42.77 | 49.77 | 0 | 47.46 | 0 | 0 | 49.77 | 49.07 |
| $Al_2O_3$ A10 (−325 mesh) (Alcoa) | 0 | 0 | 0 | 47.46 | 0 | 47.46 | 47.46 | 0 | 0 |
| $Al(OH)_3$ Gibbsite (Alcan) | 0 | 5.00 | — | 3.04 | 3.04 | 3.04 | 3.04 | 0 | 0 |
| $SrCO_3$ (−325 mesh) (Chemical Products) | 9.90 | 9.90 | 9.90 | 9.8 | 9.8 | 9.8 | 9.8 | 9.9 | 9.25 |
| $Fe_2O_3$ Hematite (Fisher Scientific) | 0.45 | 0.45 | 0.45 | 0.22 | 0.22 | 0.22 | 0.22 | 0.45 | 0.45 |
| $TiO_2$ 3020 ® (−325 mesh) (Kronos) | 29.77 | 29.77 | 29.77 | 29.48 | 29.48 | 29.48 | 0 | 29.48 | 29.83 |
| $TiO_2$ Ti-pure (DuPont) | 0 | 0 | 0 | 0 | 0 | 0 | 29.48 | 0 | 0 |
| Silicone Resin (Dow Corning) | 0 | 0 | 5.0 | 0 | 0 | 0 | 0 | 0 | 0 |
| Pore Former | | | | | | | | | |
| Graphite (A625) (Asbury) | 0 | 0 | 0 | 0 | 0 | 20 | 20 | 0 | 0 |
| Polyethylene Beads (Equistar) | 0 | 0 | 0 | 10.0 | 0 | 0 | 0 | 0 | 0 |
| Binder, Lubricant, and Solvent | | | | | | | | | |
| Methocel A4M ® (Dow Corning) | 4.50 | 4.50 | 4.5 | 0 | 0 | 0 | 0 | 0 | 0 |
| Methocel Aqualon 334 (Hercules) | 0 | 0 | 0 | 4.5 | 4.5 | 4.5 | 4.5 | 6 | 6 |
| Oleic Acid (Fisher Scientific) | 1.00 | 1.00 | 1.0 | 1.0 | 1.0 | 0 | 0 | 2 | 2 |
| Tall Oil (S and S Chemical) | 0 | 0 | 0 | 0 | 0 | 1.0 | 1.0 | 0 | 1.0 |
| TriEthanol Amine 99 ® (Dow Corning) | 0.15 | 0.15 | 0.15 | 0.15 | 0.15 | 0.15 | 0.15 | 0.0 | 0.0 |
| Water | 17 | 17 | 17 | 17 | 17 | 17 | 17 | 17 | 17 |

TABLE II

Firing Conditions and Properties for Inventive Examples 1–9.

| | Example Number | | | | | | | | |
|---|---|---|---|---|---|---|---|---|---|
| | 1 | 2 | 3 | 4 | 5 | 6 | 7 | 8 | 9 |
| Firing Conditions | | | | | | | | | |
| Furnace Type | electric | electric | electric | electric | electric | electric | electric | electric | electric |
| First Hold Temperature (° C.)/Time (hours) | 1200/4 | 1200/4 | 1200/4 | 1200/4 | 1200/4 | 1200/4 | 1200/4 | — | — |
| Second Hold Temperature (° C.)/Time (hours) | 1500/6 | 1500/6 | 1500/6 | 1500/6 | 1500/6 | 1500/6 | 1500/6 | 1500/4 | 1500/4 |
| Properties | | | | | | | | | |
| Modulus of Rupture (psi) | 191 | 361 | 270 | 187 | 206 | 208 | 220 | 487* | 784* |
| Porosity (% by volume) | 42.24 | 34.41 | 33.96 | 46 | 40.8 | 46.0 | 43.9 | 54 | 36 |
| Mean Pore Size ($\mu m$) | 13.78 | 8.40 | 10.52 | 13.8 | 16.8 | 12.6 | 17.8 | 20 | 19 |
| CTE (RT to 800–1000° C.) ($10^{-7}$/° C.) | 5.4/9.6 | 0.9/5.1 | 1.9/6.3 | 11.2 | 4.6 | 9.4 | 10.7 | 12 | 11 |
| Permeability ($10^{-12}$ $m^2$) | — | 0.243 | — | — | — | — | — | — | — |

*MOR is measured on a solid rod of circular cross section.

TABLE III

Properties of Examples 2 and 3 as a function of heat treatment.

| Example | 2 | 3 | 3 | 3 |
|---|---|---|---|---|
| Firing Conditions | | | | |
| First Hold Temperature (° C.)/Time (hours) | 1300/4 | 1350/4 | 1300/4 | 1100/4 |
| Second Hold Temperature (° C.)/Time (hours) | 1490/6 | 1490/4 | 1490/6 | 1300/4 |
| Third Hold Temperature (° C.)/Time (hours) | — | 1475/4 | — | 1485/6 |
| Properties | | | | |
| Modulus of Rupture (psi) | 354 | 255 | 269 | 250 |
| Porosity (% by volume) | 39.13 | 38.31 | 37.88 | 36 |
| Mean Pore Size (μm) | 6.77 | 10.37 | 9.73 | 12 |
| CTE (22–800/1000° C.) ($10^{-7}$/° C.) | 4.8/8.8 | 3.7/5.1 | 4.9/8.9 | 2.0/6.0 |
| Permeability ($10^{-12}$ m$^2$) | 0.219 | 0.4090 | 0.483 | 0.500 |

What is claimed is:

1. A ceramic article having a composition comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1), and 0.5<u≦0.95, 0.01<v≦0.5, 0.01<w≦0.5, 0≦x≦0.5, 0≦y≦0.1, 0≦z≦0.5, 0<a≦0.3, and 0≦b≦0.3.

2. The ceramic article of claim 1 wherein R is $SrO—Al_2O_3\text{-}2SiO_2$.

3. The ceramic article of claim 1 wherein R is $11.2SrO\text{-}10.9Al_2O_3\text{-}24.1SiO_2—TiO_2$.

4. The ceramic article of claim 1 having a CTE, as measured from room temperature to 800° C.–1000° C. of less than $45\times10^{-7}$/° C.

5. The ceramic article of claim 4 having a CTE, as measured from room temperature to 800° C.–1000° C. of less than $25\times10^{-7}$/° C.

6. The ceramic article of claim 5 having a CTE, as measured from room temperature to 800° C.–1000° C. of less than $5\times10^{-7}$/° C.

7. The ceramic article of claim 1 having a porosity of up to 60% by volume.

8. The ceramic article of claim 7 having a porosity of up to 45% by volume.

9. The ceramic article of claim 7 having a porosity of up to 55% by volume.

10. The ceramic article of claim 1 having a median pore size of up to 25 micrometers.

11. The ceramic article of claim 10 having a median pore size of up to 20 micrometers.

12. The ceramic article of claim 11 having a median pore size of up to 15 micrometers.

13. The ceramic article of claim 1 having a four-point modulus of rupture as measured on a solid rod of circular cross section of greater than 400 pounds per inch (psi).

14. The ceramic article of claim 13 having a four-point modulus of rupture as measured on a solid rod of circular cross section of greater than 700 psi.

15. A diesel particulate filter comprising the ceramic article of claim 1 and a plugged, wall-flow honeycomb filter body comprising a plurality of parallel end-plugged cell channels traversing the body from a frontal inlet end to an outlet end thereof.

16. The diesel particulate filter of claim 15 wherein the ceramic article has a composition comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1), and u=0.6965, v=0.225, w=0.075, x=0, y=0, z=0, a=0.0035, and b=0.

17. The diesel particulate filter of claim 16 having a CTE, as measured from room temperature to 800° C.–1000° C. of less than $15\times10^{-7}$/° C.

18. The diesel particulate filter of claim 17 having a CTE, as measured from room temperature to 800° C. –1000° C. of less than $5\times10^{-7}$/° C.

19. The diesel particulate filter of claim 16 having a porosity of 30% to 50% by volume.

20. The diesel particulate filter of claim 19 having a porosity of 35% to 45% by volume.

21. The diesel particulate filter of claim 16 having a median pore size of 5 to 25 micrometers.

22. The diesel particulate filter of claim 21 having a median pore size of 10 to 15 micrometers.

23. The diesel particulate filter of claim 16 having a modulus of rupture as measured by on a cellular bar having a cell density of 200 cpsi and 0.016 inch thick walls, of 150 to 400 psi.

24. The diesel particulate filter of claim 23 having a modulus of rupture as measured by on a cellular bar having a cell density of 200 cpsi and 0.016 inch thick walls of 150 to 300 psi.

25. The diesel particulate filter of claim 16 having a permeability of at least $0.20\times10^{-12}$ m$^2$.

26. The diesel particulate filter of claim 25 having a permeability of at least $0.33\times10^{-10}$ m$^2$.

27. The diesel particulate filter of claim 16 having a pressure drop of 5 kPa or less at an artificial carbon soot loading of up to 5 g/L and a flow rate of 210 standard cubic feet per minute (scfm) for a cell density of 273 cells per square inch and a cell wall thickness of about 0.015 inches.

28. A method of making an aluminum titanate-based ceramic body comprising:

(a) formulating a batch of inorganic raw materials comprising sources of silica, alumina, strontium, titania, and/or iron oxide together with organic processing comprising plasticizers, lubricants, binders, and water as solvent, and mixing to form a homogeneous and plasticized mixture;

(b) shaping the plasticized mixture into a green body;

(c) heating the green body at 20–40° C./hr over various temperature intervals with hold temperature and times between 1100°–1650° C. for a period of 30–50 hours to develop a ceramic having a composition comprising u $(Al_2O_3—TiO_2)$+v (R)+w $(3Al_2O_3\text{-}2SiO_2)$+x $(Al_2O_3)$+y $(SiO_2)$+z $(1.1SrO\text{-}1.5Al_2O_3\text{-}13.6SiO_2—TiO_2)$+a $(Fe_2O_3—TiO_2)$+b $(MgO\text{-}2TiO_2)$, where, R is $SrO—Al_2O_3\text{-}2SiO_2$ or $11.2SrO\text{-}10.9Al_2O_3\text{-}24.1SiO_2—TiO_2$, where u, v, w, x, y, z, a and b are weight fractions of each component such that (u+v+w+x+y+z+a+b=1), and 0.5<u≦0.95, 0.01<v≦0.5, 0.01<w≦0.5, 0≦x≦0.5, 0≦y≦0.1, 0≦z≦0.5, 0<a≦0.3, and 0≦b≦0.3.

29. The method of claim 28 wherein the heating is between 1100°–1500° C.

30. The method of claim 28 wherein the shaping is done by extrusion.

31. The method of claim 30 wherein the plasticized mixture is extruded into a honeycomb green body.

32. The method of claim 28 wherein the ceramic has a composition comprising u $(Al_2O_3$—$TiO_2)$+v (R)+w $(3Al_2O_3$-$2SiO_2)$+x $(Al_2O_3)$+y $(SiO_2)$+z $(.1SrO$-$1.5Al_2O_3$-$13.6SiO_2$—$TiO_2)$+a $(Fe_2O_3$—$TiO_2)$+b $(MgO$-$2TiO_2)$, where, R is $SrO$—$Al_2O_3$-$2SiO_2$ or $11.2SrO$-$10.9Al_2O_3$-$24.1SiO_2$—$TiO_2$, where u, v, w, x, y, z, a and b are weight fractions of each component such that (u+v+w+x+y+z+a+b=1), and u 0.6965, v=0.225, w=0.075, x=0, y=0, z=0, a=0.0035, and b=0.

33. A ceramic article having a composition comprising $Al_2O_3$—$TiO_2$, $3Al_2O_3$-$2SiO_2$, and $SrO$—$Al_2O_3$-$2SiO_2$.

* * * * *

UNITED STATES PATENT AND TRADEMARK OFFICE
CERTIFICATE OF CORRECTION

PATENT NO. : 7,001,861 B2  
APPLICATION NO. : 10/626317  
DATED : February 21, 2006  
INVENTOR(S) : George Halsey Beall et al.

Page 1 of 1

It is certified that error appears in the above-identified patent and that said Letters Patent is hereby corrected as shown below:

| No. | Col. | Line | Description |
|---|---|---|---|
| 1 | 10 | 37 | " $0.33 \times 10^{-10}\, m^2$ " should be -- $0.33 \times 10^{-12}\, m^2$ --. |
| 2 | 11 | 7 | " (.1SrO- " should be -- (1.1SrO- --. |
| 3 | 12 | 3 | " u 0.6965 " should be -- u=0.6965 --. |

Signed and Sealed this

Sixth Day of March, 2007

JON W. DUDAS  
*Director of the United States Patent and Trademark Office*